United States Patent [19]

Andeen

[11] Patent Number: 4,637,783

[45] Date of Patent: Jan. 20, 1987

[54] FLUID MOTOR-PUMPING APPARATUS AND METHOD FOR ENERGY RECOVERY

[75] Inventor: Gerry B. Andeen, Menlo Park, Calif.

[73] Assignee: SRI International, Menlo Park, Calif.

[21] Appl. No.: 198,716

[22] Filed: Oct. 20, 1980

[51] Int. Cl.$^4$ .............................................. F04B 9/08
[52] U.S. Cl. .................................... 417/318; 417/393
[58] Field of Search ........................ 417/317, 318, 393

[56] References Cited

U.S. PATENT DOCUMENTS

| | | | |
|---|---|---|---|
| 421,159 | 2/1890 | Broun | 417/318 |
| 2,816,822 | 12/1957 | Hess et al. | 417/393 X |
| 3,349,995 | 10/1967 | Sheesley | 417/393 X |
| 3,825,122 | 7/1974 | Taylor | 417/404 X |
| 4,176,057 | 11/1979 | Wheatley et al. | 210/137 |

FOREIGN PATENT DOCUMENTS 2812761 10/1978 Fed. Rep. of Germany .
1176531 1/1970 United Kingdom .

OTHER PUBLICATIONS

Gerald B. Gilbert, "Development of Flow Work Exchangers for Energy Recovery in Reverse Osmosis Plants", R&D Rpt. #680 (Apr. 1971), Office of Saline Water, U.S. Dept. of Interior.

Melvin E. Mattson et al., "Office of Water Research and Technology Research and Development Program on Energy Recovery Systems", paper presented at 8th Ann. Conf., Natl. Water Supply Improvement Assen., San Francisco, Cal., Jul. 6-10, 1980.

Primary Examiner—Leonard E. Smith
Attorney, Agent, or Firm—Victor R. Beckman

[57] ABSTRACT

Motor-pumping method and apparatus for recovery of energy from spent brine discharged from a reverse osmosis desalination system are disclosed. Energy of spent brine discharged from the reverse osmosis system is used to pump a portion of the fresh brine input to the system. The novel apparatus includes a pair of closed cylinders having pistons reciprocable therein which are interconnected for simultaneous piston movement. First valve means movable between first and second conditions are provided for atternatively connecting a source of fresh brine to the reduced piston area side of one of said cylinders while connecting the reduced area piston side of the other cylinder to the inlet of the reverse osmosis canister included in the reverse osmosis system. Second valve means movable between first and second conditions are provided for atternatively connecting the spent brine outlet from the reverse osmosis system canister to the large piston area side of the other cylinder while venting spent brine from the large piston area side of the one cylinder. Because of the differential opposite surface areas of the motor-pump pistons, fresh brine is pumped from the cylinders at a pressure higher than the pressure of spent brine operating liquid supplied to the motor-pump means from the reverse osmosis system. The first and second valve means operate under control of the position of the pistons in the cylinders for reciprocal piston operation.

20 Claims, 3 Drawing Figures

FLUID MOTOR-PUMPING APPARATUS AND METHOD FOR ENERGY RECOVERY

ORIGIN OF THE INVENTION

The Government has rights in this invention pursuant to Contract Number 14-34-0001-1403 awarded by the Office of Water Research and Technology of the U.S. Department of the Interior.

BACKGROUND OF THE INVENTION

Reverse osmosis systems have long been used for purifying water from salt-contaminated wells, cleaning industrial wastes, and the like, wherein salt concentrations of less than 5,000 parts per million (ppm) are present. Because of the low concentrations involved, the required pressure also is low, on the order of 200–300 pounds per square inch (psi), and the recovery (i.e. percentage of brine pumped which is converted to fresh water) is high, on the order of 90–95 percent; only a small amount of concentrated brine being needed to carry away the salts rejected by the reverse osmosis membrane.

Seawater reverse osmosis desalination is known, of course, which involves obtaining fresh water from seawater in which the salt concentration is on the order of say 35,000 to 40,000 ppm. Now, the required pressure is on the order of 800–1000 psi, and recovery is no greater than about 30 percent before the concentration of the brine exceeds the solubility levels for some of its constituents. Some pretreatment of the seawater is required for a 30 percent recovery; the 30 percent figure representing an optional balance between the costs of pretreatment and the present costs of pumping. The disposal of 70 percent of the high pressure brine from the reverse osmosis device represents a significant energy loss, and requires a significant investment in pumping equipment.

Energy recovery means for recovering energy from the high pressure spent brine discharged from reverse osmosis systems are known as shown, for example, in U.S. Pat. No. 3,825,122 to Taylor, Federal Republic of Germany Pat. No. 2,812,761 to Keefer, and in an article entitled Development of Flow Work Exchangers for Energy Recovery in Reverse Osmosis Plants, Research and Development Progress Report No. 680, April 1971, by Gilbert et al, U.S. Government Printing Office Stock No. 2400-0633. A current survey type article on the subject, "Office of Water Research and Technology Research Program on Energy Recovery Systems" was presented by M. R. Mattson and E. P. Easton, Jr. at the National Water Supply Improvement Association Conference in July 1980. With prior art arrangements, pumping means operated by the spent brine discharged from the reverse osmosis system are incapable of operating at a sufficiently high discharge pressure to feed fresh brine to the system without the use of some auxiliary booster pump which, of course, adds to the initial and maintenance costs of such systems.

SUMMARY OF THE INVENTION

An object of this invention is the provision of improved method and means for recovery of energy from fluid discharged under pressure from an operating system, and using said energy to supply feed fluid to said system.

An object of this invention is the provision of improved energy recovery method and means of the above mentioned type which is particularly useful in pumping fresh brine at high pressure to the inlet of a reverse osmosis desalination system using spent brine from said system as motive fluid for operation of high pressure pumping means.

An object of this invention is the provision of improved energy recovery method and means of the above-mentioned type which are of extremely simple design and readily adapted for use with existing reverse osmosis desalination plants of different capacity, and which may be operated to increase both the efficiency and/or capacity of the plant.

The above and other objects and advantages of this invention are achieved by use of a plurality of closed cylinders, each with a piston reciprocally movable therein. The pistons are interconnected by piston rods for simultaneous piston motion. The opposite faces of the pistons are of different effective area to provide for pressure amplification in the pumping of fresh brine to a reverse osmosis system by spent brine from the system. Spent brine is sequentially supplied through suitable valve means to the cylinders to the large face of the associated piston to produce reciprocating motion of the interconnected pistons. Simultaneously, fresh brine at the opposite end of the cylinders is sequentially pumped to the inlet of the reverse osmosis system to augment the supply of fresh brine provided by main pumping means. During the return piston stroke, spent brine is discharged from the one end of the associated cylinder and fresh brine from a suitable source thereof is supplied to the other end thereof.

BRIEF DESCRIPTION OF THE DRAWINGS

The invention, together with further objects and advantages thereof, will be better understood from the following description considered with the accompanying drawings. In the drawings, wherein like reference characters refer to the same parts in the several views.

Figure 1:
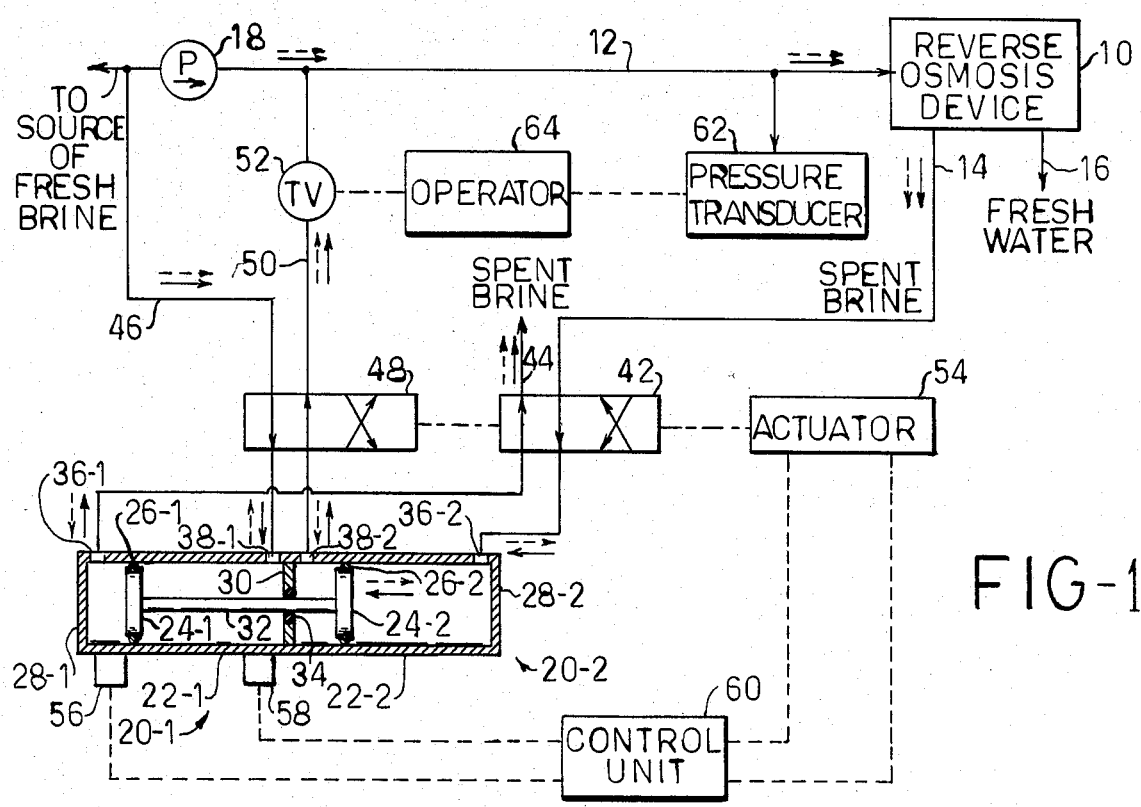
FIG. 1 is a schematic diagram showing a reverse osmosis system which includes novel energy recovery means embodying the present invention.

Reference first is made to FIG. 1 of the drawings wherein a reverse osmosis device 10 for desalination of seawater is shown which includes a fresh brine inlet 12, spent brine outlet 14, and fresh water outlet 16. Fresh brine from a source of pretreated seawater, not shown, is supplied to the inlet of the reverse osmosis device by means of a high pressure pump 18. Water passes through semipermeable membranes included in the reverse osmosis device 10 and is discharged from the fresh water outlet 16. Concentrated salt water is discharged from the spent brine outlet 14 at a lower pressure than the inlet pressure. For illustration only, and not by way of limitation, fresh brine inlet and spent brine outlet pressures on the order of 860 psi and 800 psi, respectively, may be employed.

The novel energy recovery means of the present invention includes a plurality of interconnected fluid motor-pump devices; two such devices 20-1 and 20-2 being shown in FIG. 1. They include first and second closed cylinders 22-1 and 22-2 containing reciprocable pistons 24-1 and 24-2. Seal rings 26-1 and 26-2 provide a substantially fluid-tight engagement between the pistons and associated cylinder walls while allowing for sliding movement of the pistons in the cylinders. First, end walls 28-1 and 28-2 close the outer ends of the cylinders 22-1 and 22-2. The cylinders may be axially aligned and integrally formed, as shown, and provided with a unitary inner end wall 30 at the inner ends thereof.

The piston 24-1 and 24-2 are interconnected for simultaneous movement thereof. In the illustrated arrangement wherein the cylinders are axially aligned, a unitary connecting rod 32 is used to interconnect the pistons, which connecting rod extends through an aperture in the inner end wall 30. A small diameter seal ring 34 at the wall aperture provides a sealing engagement between the rod and wall while allowing for axial movement of the rod therewith.

The cylinders 20-1 and 20-2 are provided with inlet-outlet port means adjacent opposite ends thereof for inflow and outflow of an operating fluid at the outer end of the cylinders, and for inflow and outflow of a fluid to be pumped at the inner end of the cylinders. As used herein the inner end of the cylinder refers to the end of the cylinder extending in the same direction as the associated piston rod. In the drawing, the unitary end wall 30 is located at the inner ends of the cylinders, and the first end walls 28-1 and 28-2 are located at the outer ends thereof. Inlet-outlet ports 36-1 and 36-2 for operating fluid are provided adjacent the outer ends of cylinders 22-1 and 22-2, respectively, and inlet-outlet ports 38-1 and 38-2 for fluid to be pumped are provided adjacent the inner ends of the respective cylinders 22-1 and 22-2. For use with the reverse osmosis device 10, the operating fluid comprises spent brine supplied to ports 36-1 and 36-2 from the device 10 through spent brine outlet conduit 14 and a first four-way valve 42. Spent brine is discharged from the cylinders through the four-way valve 42 and a discharge conduit 44. Fresh brine to be pumped to the reverse osmosis device by the motor-pump 20-1 and 20-2 is supplied to the inlet-outlet ports 38-1 and 38-2 at the inner ends of the cylinders through a supply conduit 46 from the source of fresh brine and a second four-way valve 48. Fresh brine is pumped from the ports 38-1 and 38-2 through the four-way valve 48, conduit 50, a throttle valve 52, and the inlet conduit 12 to the reverse osmosis device 10.

The two-position four-way valves 42 and 48 are actuated by an actuator 54 of any suitable type, such as a hydraulic, pneumatic, solenoid, or like actuator. For purposes of description, the actuator may include solenoids for shifting the valves in opposite directions. Transducers 56 and 58 are located adjacent opposite ends of the cylinder 22-1 for sensing the piston 24-1 at the respective opposite start and end positions of travel of the piston. Proximity detecting transducers of the capacitive, magnetic, or like type, may be employed. The transducer outputs are connected to the actuator 54 through a control unit 60. When the piston 24-1 is sensed by transducer 56, the signal therefrom to the control unit 60 results in a control unit output which is supplied to the actuator 54 for shifting the valves 42 and 48 to reverse the direction of flow of fluid to and from the cylinder chambers. At the other end of piston travel the transducer 58 provides an output to the control unit 60 for energizing the actuator 54 to shift the valves 42 and 48 back to the illustrated positions.

The throttle valve 52 in the fresh brine discharge line 50 from the motor-pump units 20-1 and 20-2 controls the system pressure. The fresh brine inlet pressure to the reverse osmosis device is sensed by a pressure transducer 62 having a variable electrical output which is supplied to a valve operator 64 which, in turn, controls opening and closing of the throttle valve 52. Assuming use of a positive displacement primary pump 18, with an increase in pressure sensed by pressure transducer 62 the throttle valve 52 is further opened which allows the energy recovery device to operate faster increasing the brine exit rate from the total system and reducing the system pressure. If desired, the throttle valve 52 may be located in spent brine outlet conduit 14, in a manner shown in FIG. 2, for system pressure control.

Although the operation of the system shown in FIG. 1 is believed to be apparent, a brief description thereof now will be given. Fresh brine at low pressure is supplied to the high pressure primary pump 18 and to the pumping chamber of one or the other of the motor-pump units 20-1 or 20-2, depending upon the position of the valve 48. In the illustrated position of the four-way valves 42 and 48, the pistons 24-1 and 24-2 are moved toward the left, as viewed in FIG. 1, in the direction of the full-line arrow inside cylinder 22-2. At such time, liquid flow in various system conduits is in the direction of full line arrows adjacent the conduits. The broken-line arrows show the direction of piston movement and fluid flow when the valves 42 and 48 are shifted to their other positions. It will be apparent, then, that in the illustrated position of the valve 48, fresh brine is supplied to the inner chamber of the cylinder 22-1 through port 38-1. Simultaneously, spent brine is pumped from the outer end of the first cylinder 22-1 through port 36-1, valve 42, and conduit 44 to a suitable brine dump. The pistons are driven by spent brine from the reverse osmosis device 10 supplied through conduit 14 and valve 42 to the outer end of the second cylinder 22-2, through port 36-2. Fresh brine at the inner end of the cylinder 22-2 is pumped through port 38-2, valve 48, conduit 50, throttle valve 52, and conduit 12 to the inlet of the reverse osmosis device 10. It will be apparent, then, that fresh brine is supplied to the reverse osmosis device at high pressure both from the main high pressure pump 18 and from the energy recovery device of the present invention.

When the pistons reach the left-most limit of travel, as viewed in FIG. 1, the transducer 56 senses piston 24-1 and supplies an output to control unit 60 which, in turn, energizes a solenoid included in actuator 54 to simultaneously operate the valves 42 and 48 to a second valve position. As a result, fluid flow to and from the cylinders is reversed whereby spent brine from the reverse osmosis device 10 now is supplied to the outer end of cylinder 22-1 to drive the interconnected pistons to the right; fresh brine from the cylinder 22-1 is pumped through port 38-1 to the reverse osmosis device; fresh brine from the source thereof is supplied to the cylinder 22-2 through port 38-2 to recharge the same; and spent brine is discharged from the cylinder 22-2 through 36-2. When the piston 24-1 reaches its end position adjacent transducer 58, it is sensed by the transducer which supplies an output to control unit 60 which, then, energizes another solenoid in actuator 54 to return the valves 42 and 48 to the illustrated first position, and the energy recovery cycle is repeated.

It will be apparent that the inner faces of the pistons have a smaller effective surface area than the outer faces due to the attachment of the connecting rod means 32 thereto. With such differential effective surface area, fresh brine is discharged from the cylinders at a pressure greater than the pressure of spent brine motive fluid supplied thereto. There is, then, a pressure amplification related to the differential piston surface area. Energy for discharging spent brine from the opposite cylinder may be provided, primarily, by the low pressure source of fresh brine supplied to the cylinder during recharging thereof. With this arrangement, no additional pumps are required to increase the pressure of the fresh brine supplied to the reverse osmosis by said energy recovery device.

Figure 2:
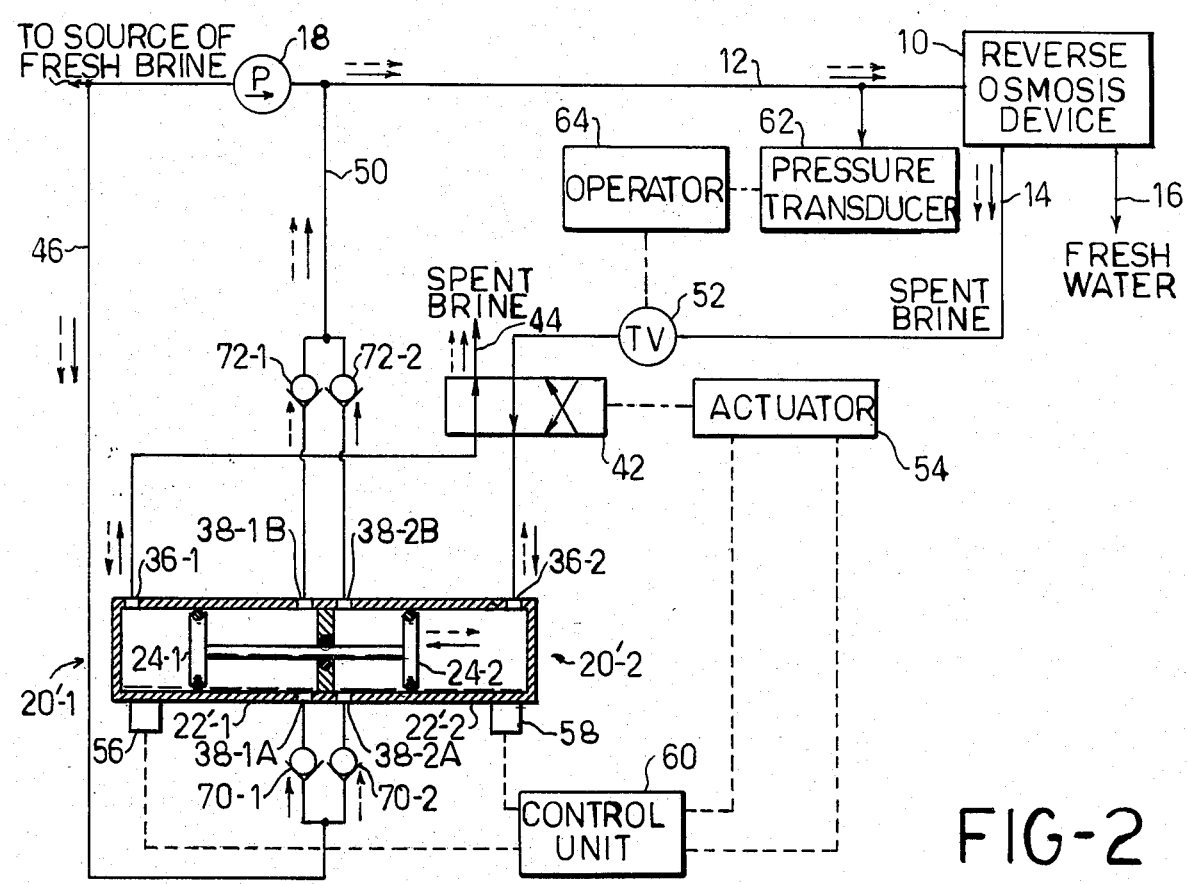
FIG. 2 is a schematic diagram which is similar to that of FIG. 1 but showing a slightly modified form of energy recovery means.

Reference now is made to FIG. 2 wherein a modified form of this invention is shown wherein a plurality of check valves are employed in place of the second four-way valve 48 for use in conducting fresh brine to and from the energy recovery device. The motor-pump units, here identified by reference characters 20'-1 and 20'-2 may be of the same construction as units 20-1 and 20-2 shown in FIG. 1 and described above. However, for purposes of illustration, the units are shown to include cylinders 22'-1 and 22'-2 which include separate inlet and outlet ports 38-1A and 38-1B, and 38-2A and 38-2B in place of the respective inlet-outlet ports 38-1 and 38-2. The pistons and remainder of the cylinders are the same as shown in the FIG. 1 arrangement. A source of fresh brine from conduit 46 is supplied to the inlet ports 38-1A and 38-2A through check valves 70-1 and 70-2, respectively. Similarly, check valves 72-1 and 72-2 connect the outlet ports 38-1B and 38-2B, respectively, to the conduit 50 which communicates with the inlet conduit 12 to the reverse osmosis device. It will be apparent that check valves 70-1 and 72-2 are open and check valves 70-2 and 72-1 are closed during movement of the pistons to the left as viewed in FIG. 2; the piston movement and fluid flow direction being shown by the full line arrows. When the piston 24-1 reaches the leftmost limit of travel, and is detected by transducer 56, the control unit 60 provides an output to the actuator 54 for movement of the four-way valve 42 to its other condition, not shown. Now, as the pistons are moved to the right, as viewed in FIG. 2, the check valves 70-2 and 72-1 are opened, and check valves 70-1 and 72-2 are closed and the direction of fresh brine fluid flow to and from the inner ends of the cylinders is reversed. Transducer 58 senses piston 24-2 at the right-most end of piston travel for return of the four-way valve 42 to the illustrated condition.

In the FIG. 2 arrangement, the throttle valve 52 is included in the outlet conduit 14 from the reverse osmosis device, instead of the output line 50 from the recovery device. (Obviously, it could be included in line 50, in the manner shown in FIG. 1.) With this arrangement, the pressure of spent brine from the reverse osmosis device 10 supplied to the energy recovery cylinders is controlled for system pressure control. Again, assuming use of a positive displacement primary pump 18, an increase in pressure at the inlet conduit 12 sensed by pressure transducer 62 causes the valve operator 64 to further open the throttle valve 52 to reduce the system pressure.

Figure 3:
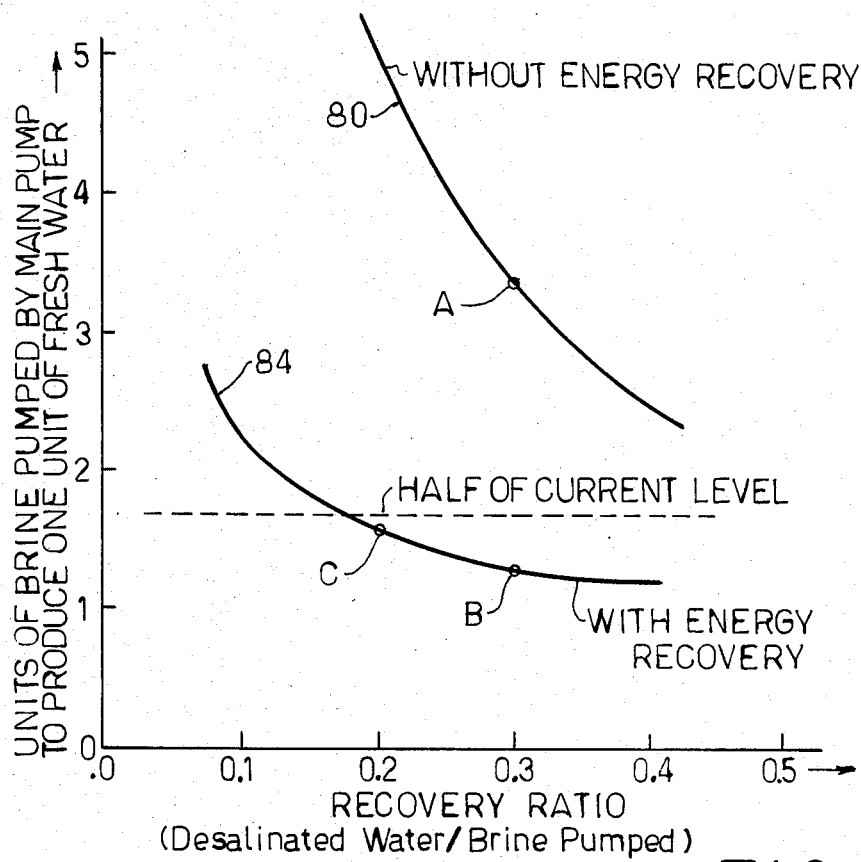
FIG. 3 is a graph showing the pump requirements of a typical reverse osmosis system and showing operating characteristics with and without the novel energy recovery means of the present invention.

Reference now is made to FIG. 3 wherein a graph of main pumping capacity required to produce a unit of desalinated outflow versus recovery i.e. the ratio of desalinated water to total brine pumped to the reverse-osmosis canisters, is shown. The upper curve 80 shows pumping requirements for a conventional reverse osmosis system wherein no energy recovery is employed. It will be seen, for example, that at an operating point for 30 percent recovery from pretreated seawater, 3.33 gallons of brine must be pumped for each gallon of freshwater produced. (See point A, curve 80.) As suggested above, in the Background of the Invention section operation at approximately a 30 percent recovery rate for pretreated seawater is common.

With the use of the present invention to pump a portion of the fresh brine, the main pump 18 is required to pump a much smaller amount of fresh brine to the reverse osmosis system. The lower curve 84 shows the same information using the energy recovery system of this invention to pump a portion of fresh brine. The curve 84 shows operation using motor-pump means having pistons wherein the effective area of the inner piston face is 85 percent of the effective area of the outer face thereof. In the illustrated recovery systems, the diameter of the connecting rod means 32 employed is one factor in establishing the area ratio across the pistons, and area ratios of 85% are readily achieved. The area ratio employed depends upon hydraulic losses in the system, including losses in the reverse osmosis canisters, and the energy recovery device itself. Assuming an 85% area ratio, it will be seen that at 30% recovery (point B, curve 84), only 1.35 gallons of fresh brine need be supplied by the main pump 18 for each gallon of fresh water delivered. A total of 3.33 gallons must still be pumped, but of this total, the energy recovery device would pump 1.98 gallons. The energy cost for operation of the system would be decreased approximately 60%. Obviously, smaller main pumps and engines for operating the same may be employed in systems utilizing the energy recovery system of this invention.

With such significant savings in pump, engine, and pumping costs, the operating point of the reverse osmosis system could be shifted for operation at a lower recovery ratio to reduce the need for pretreatment. At a recovery ratio of 0.2, for example, the only pretreatment required would be filtering. (See point C at curve 84.) The cost of pumping would still be less than half of what it would be at the 30% operating point without energy recovery, with total elimination of pretreatment costs, except for filtering. At the lower recovery ratio, the membrane replacement rate also would be decreased for added savings.

With the present invention, the piston seal rings 26-1 and 26-2 included in the motor-pump units are subjected to relatively low pressure differences. As noted, the motor-pump units operate with pressure amplification, and the piston seals must withstand such pressure augmentation, which is made essentially equivalent to the flow-pressure drop through the reverse osmosis canister 10. Pressures on the order of only, say, 60–80 psi are typical. The smaller piston rod seal 34 must, of course, withstand much higher pressures. With the illustrated arrangement, wherein a unitary inner wall 30 is provided between cylinders, only a single piston rod seal is required. Being of a smaller diameter, sealing problems are substantially reduced. Use of the illustrated axially aligned cylinders also reduces alignment problems, thus making piston design simple. Also, since flow work is transferred directly across the pistons, and not by forces in the piston rod means, the rod is not a major load-carrying element. Its size can be selected by other constraints, namely the necessary pressure amplification. Since the energy recovery device operates at a speed directly related to the flow rate of the reverse osmosis system, one size device (or multiples of devices) will operate with a wide range of reverse osmosis systems. Since the energy recovery system of the present invention is independent of the main fresh brine pump(s) the application of the invention to existing reverse osmosis systems is practical, uncomplicated, and economical. Capacity of an existing desalination plant easily could be doubled with the addition of the present energy recovery device by using the same main pump(s).

The invention having been described in detail in accordance with requirements of the Patent Statutes, various other changes and modifications will suggest themselves to those skilled in this art. For example, the energy recovery device of this invention may include more than the illustrated two motor-pump units shown in FIGS. 1 and 2. Three or more motor-pump cylinders may be employed having their piston rods interconnected by use of a crank. The start positions of the pistons may be staggered to provide a more uniform rate of pumping of fresh brine to the osmosis system by the energy recovery system. It is intended that the above and other such changes and modifications shall fall within the spirit and scope of the invention as defined in the appended claims.

I claim:

1. In a method of delivering fresh brine to a reverse osmosis device by use of main pump means and a plurality of interconnected motor-pump means using spent brine from the reverse osmosis device as motive fluid for said motor-pump means, each motor-pump means including a closed cylinder with a reciprocably movable piston therein separating the cylinder into motor and pump chambers, each piston having opposite faces of different effective area with the larger piston face being included in the motor chamber and the smaller face in the pump chamber for pressure amplification, said pistons being interconnected for simultaneous movement thereof, said method comprising sequentially supplying spent brine from the reverse osmosis device, through non-pressure-increasing means, to the motor chambers for piston movement from start to end positions while simultaneously sequentially pumping fresh brine from the associated pump chambers, through non-pressure-increasing means, to the inlet of the reverse osmosis device for supplying the reverse osmosis device with a first quantity of fresh brine for desalination, sequentially supplying fresh brine to the pump chambers while simultaneously sequentially dumping spent brine from the associated motor chambers during return piston movement from end to start positions, and through said main pump means, supplying the reverse osmosis device with a second quantity of fresh brine for desalination.

2. In a method as defined in claim 1 including controlling system pressure by pumping fresh brine from the pump chambers to the inlet of the reverse osmosis device through a throttle valve, and controlling the throttle valve setting in accordance with the pressure at the inlet to the reverse osmosis device, the throttle valve being further opened and closed with an increase and decrease, respectively, in the pressure at the inlet to the reverse osmosis device to lower and raise, respectively, said pressure.

3. In a method as defined in claim 1 including controlling system pressure by passing spent brine from said reverse osmosis device to the motor chambers through a throttle valve, and controlling the throttle valve setting in accordance with the presure at the inlet to the reverse osmosis device, the throttle valve being further opened and closed with an increase and decrease, respectively, in the pressure at the inlet to the reverse osmosis device to respectively lower and raise said pressure.

4. Energy recovery and secondary pump means for use in pumping additional fresh brine to a reverse osmosis system, which system includes an inlet to which fresh brine is pumped, a fresh water outlet from which fresh water is discharged, and a spent brine outlet from which spent brine is discharged at a pressure less than the pressure of fresh brine at the inlet, a source of fresh brine, and main pumping means for supplying brine from the fresh brine source to the fresh brine inlet, said energy recovery and secondary pump means including, first and second closed cylinders, first and second pistons reciprocably movable in said respective first and second cylinders, each piston having opposite first and second faces, the first of which faces is larger than the second of said faces, means interconnecting the second faces of the pistons for simultaneous movement thereof, each cylinder having first inlet-outlet port means for inflow and outflow of spent brine from the reverse osmosis system adjacent the first face of the associated piston, and second inlet-outlet port means for inflow and outflow of fresh brine from said fresh brine source adjacent the second face of the associated piston, non-pressure-increasing means for transmitting spent brine from the reverse osmosis system to said first port means, each piston being movable between a start position adjacent the first port means of the associated cylinder and an end position adjacent the second port means such that when said first piston is in its start position the second piston is in its end position and, as spent brine from the reverse osmosis system is admitted to the first cylinder through said first port means thereof, the first piston is moved to its end position and the second piston is moved by said interconnecting means to its start position, such movements being reversed upon admission of spent brine from the reverse osmosis system to said second cylinder through said first port means thereof, means for admitting fresh brine from said fresh brine source to be pumped to said second cylinder through said second port means thereof and simultaneously discharging pumped fresh brine from said first cylinder through said second port means thereof when said first piston is moved from its start to its end position, and for admitting fresh brine from said fresh brine source to be pumped to said first cylinder through said second port means thereof and simultaneously discharging pumped fresh brine from said first cylinder through said second port means thereof when said second piston is moved from its start to its end position, and non-pressure-increasing means for connecting fresh brine pumped from said first and second cylinders to the inlet of said reverse osmosis system for supplying of fresh brine to said reverse osmosis system from both said energy recovery and secondary pump means and from said main pumping means.

5. Energy recovery and secondary pump means as defined in claim 4 wherein fresh brine is pumped from said cylinders at a higher pressure and smaller volume than the pressure and volume, respectively, of spent brine supplied to said cylinders from said reverse osmosis system.

6. Energy recovery and secondary pump means as defined in claim 4 wherein at least one-half of fresh brine supplied to the reverse osmosis system is supplied through said energy recovery and secondary pump means, the remainder being supplied thereto through said main pumping means.

7. Energy recovery and secondary pump means for use in pumping fresh brine to a reverse osmosis system, which system includes an inlet to which fresh brine is pumped, a fresh water outlet from which fresh water is discharged, and a spent brine outlet from which spent brine is discharged at a pressure less than the pressure of fresh brine at the inlet, a source of fresh brine, and main pump means for supplying brine from the fresh brine source to the fresh brine inlet in addition to fresh brine supplied thereto by said energy recovery and secondary pump means, said energy recovery and secondary pump means including, first and second axially aligned cylinders having opposite closed inner and outer ends, first and second pistons axially movable in said respective first and second cylinders, each piston having opposed inner and outer faces, means for interconnecting the inner faces of the pistons for simultaneous movement thereof, the effective area of the outer faces being greater than that of the inner faces thereof, non-pressure-increasing means including first valve means movable between first and second conditions for directing spent brine from the reverse osmosis system to the outer end of the first cylinder to drive said interconnected pistons in one direction while venting spent brine from the outer end of the second cylinder in the first condition of said first valve means, and for directing spent brine from the reverse osmosis system to the outer end of the second cylinder to drive said interconnected pistons in an opposite direction while venting spent brine from the outer end of the first cylinder in the second condition of said first valve means, and means including second valve means for directing fresh brine from a fresh brine source to the inner end of the second cylinder while directing fresh brine contained in the inner end of the first cylinder to the fresh brine inlet of the reverse osmosis system during movement of said pistons in said one direction, and for directing fresh brine from a fresh brine source to the inner end of the first cylinder while directing fresh brine contained in the inner end of the second cylinder to the fresh brine inlet of the reverse osmosis system during movement of said pistons in said opposite direction, the fresh brine supplied to the fresh brine inlet of the reverse osmosis system from the inner ends of the first and second cylinders being in addition to fresh brine supplied to the fresh brine inlet of the reverse osmosis system from the main pump means, the fresh brine from the inner ends of the first and second cylinders being supplied to the fresh brine inlet of the reverse osmosis system through non-pressure increasing means.

8. Energy recovery means as defined in claim 7 where said first valve means comprises a first four-way valve movable between said first and second conditions at opposite end positions of said interconnected pistons.

9. Energy recovery means as defined in claim 8 wherein said second valve means comprises a second four-way valve simultaneously movable between first and second valve conditions with said first four-way valve.

10. Energy recovery means as defined in claim 8 wherein said second valve means comprises a plurality of check valves.

11. Energy recovery and secondary pump means as defined in claim 7 including a throttle valve in at least one of the reverse osmosis system spent brine outlet and said means for directing fresh brine to the fresh brine inlet of the reverse osmosis system from said first and second cylinders for control of reverse osmosis system pressure.

12. Energy recovery and secondary pump means as defined in claim 11 including means responsive to the pressure of fresh brine at the inlet to the reverse osmosis system for automatic control of the throttle valve setting, the pressure of fresh brine at the inlet to the reverse osmosis system being increased and decreased as the throttle valve is closed and opened, respectively.

13. Energy recovery and secondary pump means for use in pumping additional fresh brine to a reverse osmosis system, which system includes an inlet to which fresh brine is pumped, a fresh water outlet from which fresh water is discharged, and a spent brine outlet from which spent brine is discharged at a pressure less than the pressure of fresh brine at the inlet, a source of fresh brine, and main pumping means for supplying brine from the fresh brine source to the fresh brine inlet, said energy recovery and secondary pump means including, a plurality of motor-pump units each of which includes a closed cylinder and a piston reciprocably movable therein, each piston having opposite inner and outer faces of different effective area with the outer face of each piston having a greater effective area than the inner face thereof, a motor chamber being formed by the larger outer face of each piston and the outer enclosed end of the associated cylinder, and a pumping chamber being formed by the smaller inner face of each piston and the inner closed end of the associated cylinder, means for interconnecting the inner faces of the pistons for simultaneous reciprocating movement of the pistons, means for sequentially supplying spent brine from the spent brine outlet of the reverse osmosis system to said motor chambers, through non-pressure-increasing means, to sequentially produce piston movement toward the inner closed end of the associated cylinders and for simultaneously sequentially pumping fresh brine from the pumping chambers, through non-pressure-increasing means, to the fresh brine inlet of the reverse osmosis system, the fresh brine from the pumping chambers to the fresh brine inlet of the reverse osmosis system being in addition to fresh brine supplied to the fresh brine inlet from said main pumping means, and means for sequentially supplying fresh brine from said fresh brine source to the pumping chambers and for simultaneously sequentially discharging spent brine from the motor chambers during piston movement toward the outer closed end of the associated cylinders.

14. The energy recovery and secondary pump means as defined in claim 13 wherein fresh brine is pumped from the pumping chambers through said non-pressure-increasing means to the fresh brine inlet of the reverse osmosis system at a higher pressure and smaller volume than the pressure and volume, respectively, of spent brine supplied to said motor chambers from said reverse osmosis system.

15. Energy recovery and secondary pump means as defined in claim 13 which includes a pair of said motor-pump units having axially aligned cyinders, said means for interconnecting the inner faces of the pistons comprising a piston rod.

16. Energy recovery and secondary pump means as defined in claim 15 wherein said cylinders include a unitary inner end wall through said piston rod extends in sliding fluid-tight engagement therewith.

17. Energy recovery and secondary pump means as defined in claim 13 wherein at least one-half of fresh brine supplied to the reverse osmosis system is supplied through said energy recovery and secondary pump means, the remainder being supplied thereto through said main pumping means.

18. Energy recovery and secondary pump means as defined in claim 17 including first four-way valve means for connecting spent brine from the reverse osmosis system to said first port means of said first and second cyclinders and for discharging spent brine from said first port means.

19. Energy recovery and secondary pump means as defined in claim 18 including second four-way valve means for admitting fresh brine from said fresh brine source to said first and second cylinders through said second port means and for discharging pumped fresh brine from said second port means.

20. Energy recovery and secondary pump means as defined in claim 18 including check valve means for admitting fresh brine from said fresh brine source to said first and second cylinders through said second port means for discharging pumped fresh brine from said second port means.

* * * * *